US009638329B2

United States Patent
Yarimizu et al.

(10) Patent No.: US 9,638,329 B2
(45) Date of Patent: May 2, 2017

(54) ENGINE REAR SEAL (75) Inventors: Kenichi Yarimizu, Fukushima (JP); Tomoaki Nishimura, Fukushima (JP)

(73) Assignee: NOK Corporation (JP)

( * ) Notice: Subject to any disclaimer, the term of this patent is extended or adjusted under 35 U.S.C. 154(b) by 0 days.

(21) Appl. No.: 14/366,872

(22) PCT Filed: Aug. 27, 2012

(86) PCT No.: PCT/JP2012/071539
§ 371 (c)(1),
(2), (4) Date: Jun. 19, 2014

(87) PCT Pub. No.: WO2013/094251
PCT Pub. Date: Jun. 27, 2013

(65) Prior Publication Data
US 2014/0339775 A1  Nov. 20, 2014

(30) Foreign Application Priority Data
Dec. 21, 2011 (JP) .................................. 2011-279433

(51) Int. Cl.
*F16J 15/3244*  (2016.01)
*F16J 15/3204*  (2016.01)
(Continued)

(52) U.S. Cl.
CPC ............ *F16J 15/3204* (2013.01); *F02F 7/00* (2013.01); *F02F 11/00* (2013.01); *F02F 11/007* (2013.01);
(Continued)

(58) Field of Classification Search
CPC .............................. F16J 15/42; F16C 33/7863
(Continued)

(56) References Cited

U.S. PATENT DOCUMENTS 2,871,039 A * 1/1959 Payne ...................... F16J 15/36
277/371
3,606,351 A * 9/1971 Hallerback ............. F16C 33/78
277/353
(Continued)

FOREIGN PATENT DOCUMENTS

CN  2521446 Y  11/2002
CN  1484737 A   3/2004
(Continued)

OTHER PUBLICATIONS

Extended European Search Report for Patent Application No. EP12859542.8 dated Jun. 23, 2015 (3 pages).

*Primary Examiner* — Kristina Fulton
*Assistant Examiner* — L. Susmitha Koneru
(74) *Attorney, Agent, or Firm* — Harness, Dickey & Pierce, P.L.C.

(57) ABSTRACT

In an engine rear seal installed to an engine rear portion having an end plate arranged in a motor exterior side of a housing, and a flywheel arranged in a motor exterior side of the end plate, the engine rear seal has an oil seal and a muddy water preventing seal. The muddy water preventing seal integrally has an attaching portion, and a seal lip directed to a diametrically outer side from the attaching portion and slidably coming into close contact with an end surface in the motor exterior side of the end plate. The seal lip has an inclined lip end back surface portion, and is structured such that a lip end comes into contact with the end surface at the low-speed rotating time and the lip end moves away from the end plate on the basis of an action of a centrifugal force at the high-speed rotating time.

7 Claims, 5 Drawing Sheets (51) Int. Cl.
  *F02F 7/00* (2006.01)
  *F02F 11/00* (2006.01)
  *F16J 15/16* (2006.01)
  *F16J 15/3232* (2016.01)
  *F16J 15/3264* (2016.01)

(52) U.S. Cl.
  CPC ......... *F16J 15/164* (2013.01); *F16J 15/3232* (2013.01); *F16J 15/3244* (2013.01); *F16J 15/3264* (2013.01)

(58) Field of Classification Search
  USPC .......................................... 277/433, 929, 349
  See application file for complete search history.

(56) References Cited

U.S. PATENT DOCUMENTS

| | | | |
|---|---|---|---|
| 3,664,675 A * | 5/1972 | Malmstrom | F16J 15/3456 277/400 |
| 3,685,838 A | 8/1972 | Malmstrom | |
| 4,428,586 A * | 1/1984 | Romero | F16J 15/3256 277/377 |
| 4,448,426 A | 5/1984 | Jackowski et al. | |
| 4,943,068 A * | 7/1990 | Hatch | F16J 15/3256 277/353 |
| 4,974,860 A * | 12/1990 | Anzue | F16J 15/164 277/351 |
| 4,991,858 A * | 2/1991 | Abila | F16L 41/088 277/606 |
| 5,018,749 A * | 5/1991 | Forch | F16J 15/3456 277/369 |
| 6,182,975 B1 * | 2/2001 | Matsushima | B29C 45/0055 277/559 |
| 6,354,598 B1 * | 3/2002 | Huang | F16J 15/3256 277/551 |
| 6,485,256 B1 | 11/2002 | Iketani | |
| 6,886,833 B1 * | 5/2005 | von Engelbrechten | F16J 15/3456 277/551 |
| 8,403,333 B2 * | 3/2013 | Berdichevsky | F16J 15/164 277/353 |
| 9,140,365 B1 * | 9/2015 | Reimer | F16J 15/3232 |
| 2004/0262845 A1 * | 12/2004 | Matsui | F16J 15/3228 277/349 |
| 2007/0187902 A1 * | 8/2007 | Kurosawa | B62D 5/062 277/551 |
| 2008/0029967 A1 * | 2/2008 | Nakagawa | F16J 15/164 277/349 |
| 2010/0244388 A1 | 9/2010 | Nakagawa et al. | |
| 2010/0259014 A1 | 10/2010 | Nakagawa | |
| 2011/0006485 A1 | 1/2011 | Nakagawa | |
| 2011/0221140 A1 * | 9/2011 | Nakagawa | F16J 15/164 277/412 |

FOREIGN PATENT DOCUMENTS

| | | |
|---|---|---|
| CN | 1768225 A | 5/2006 |
| CN | 101057094 A | 10/2007 |
| CN | 101111702 A | 1/2008 |
| DE | 1956137 A1 | 5/1970 |
| DE | 2414634 A1 | 10/1974 |
| EP | 1777446 A1 | 4/2007 |
| EP | 1845291 A1 | 10/2007 |
| EP | 2287486 A1 | 2/2011 |
| GB | 1455326 A | 11/1976 |
| JP | S48-40624 B1 | 12/1973 |
| JP | S61-165885 U | 10/1986 |
| JP | H04-017567 U | 12/1992 |
| JP | H05-083540 U | 11/1993 |
| JP | H08-061143 A | 3/1996 |
| JP | 2005-240996 A | 9/2005 |
| JP | 2006-046097 A | 2/2006 |
| JP | 2010-025137 A | 2/2010 |
| JP | 2011-220389 A | 11/2011 |
| WO | WO-2005-003604 A1 | 1/2005 |
| WO | WO-2006006338 A1 | 1/2006 |

\* cited by examiner

ENGINE REAR SEAL

CROSS-REFERENCE TO RELATED APPLICATIONS

This application is a U.S. National Stage Application of International Application No. PCT/JP2012/071539, filed on Aug. 27, 2012 and published in Japanese as WO 2013/094251 on Jun. 27, 2013. This application claims the benefit of Japanese Application No. 2011-279433, filed on Dec. 21, 2011. The disclosures of the above applications are incorporated herein by reference.

BACKGROUND OF THE INVENTION

Field of the Invention

The present invention relates to an engine rear seal which is used for inhibiting muddy water from entering as well as sealing an engine oil in a rear end portion of a crank shaft in an engine for a vehicle such as a motor vehicle.

Description of the Conventional Art

Figure 5:
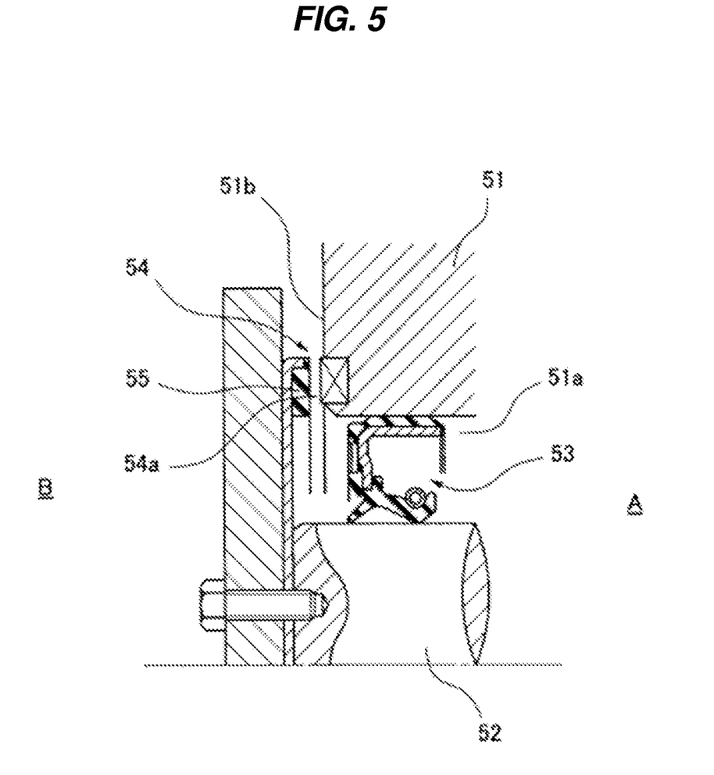
FIG. 5 is a half cut cross sectional view of an engine rear seal according to a prior art.

An engine rear seal which has been previously proposed by the applicant of the present invention and is shown in FIG. 5 is structured such that a non-contact type dust seal 54 is provided in a motor exterior side B of an oil seal 53 which is installed to an inner periphery of a shaft hole 51a of a housing 51 and slidably comes into close contact with a peripheral surface of a shaft 52, the non-contact type dust seal 54 being constructed by a combination of a magnetic encoder 55 and a housing end surface 51b, and the engine rear seal is a double seal structure which is constructed by the dust seal 54 and the oil seal 53. Therefore, it is possible to achieve an excellent sealing performance.

However, since the non-contact type seal 54 is structured such as to be provided in the motor exterior side B of the oil seal 53, muddy water in the motor exterior side B enters through a gap portion 54a of the non-contact type seal 54. With reference to the muddy water entrance, it is demanded to further improve a sealing performance against the muddy water (a muddy water sealing performance).

SUMMARY OF THE INVENTION

Problem to be Solved by the Invention

The present invention is made by taking the above point into consideration, and an object of the present invention is to provided an engine rear seal which can further improve a muddy water sealing performance, and can inhibit rotary torque from being increased.

Means for Solving the Problem

In order to achieve the object mentioned above, an engine rear seal according to a first aspect of the present invention is an engine rear seal installed to an engine rear portion in which an end plate is arranged in a motor exterior side of a housing, and a flywheel connected to a shaft is arranged in further a motor exterior side of the end plate, wherein the engine rear seal has an oil seal which is installed to an inner periphery of a shaft hole of the housing and slidably comes into close contact with a peripheral surface of the shaft, and a muddy water preventing seal which is arranged in a motor exterior side of the oil seal, the muddy water preventing seal integrally has an attaching portion which is attached onto the peripheral surface of the shaft, and a seal lip which is provided so as to be directed to an outer side in a diametrical direction from the attaching portion and slidably comes into close contact with an end surface in the motor exterior side of the end plate, the seal lip has a lip end back surface portion which is formed into an inclined surface shape so that an outer diameter becomes smaller according to moving far away from the end surface in the motor exterior side of the end plate, and the seal lip is structured such that a lip end comes into contact with the end surface in the motor exterior side of the end plate when the shaft rotates at a low speed, and the lip end moves away from the end surface in the motor exterior side of the end plate on the basis of an action of a centrifugal force when the shaft rotates at a high speed.

Further, an engine rear seal according to a second aspect of the present invention is the engine rear seal described in the first aspect mentioned above, wherein the muddy water preventing seal is attached onto a peripheral surface of the shaft in an inner peripheral side of the end plate in which a gap in an axial direction between the muddy water preventing seal and the flywheel is set to be equal to or less than 3 mm.

In the engine rear seal according to the present invention provided with the structure mentioned above, under a condition that the end plate is arranged in the motor exterior side of the housing, and the flywheel connected to the shaft is arranged in further the motor exterior side of the end plate, the muddy water preventing seal is combined with the oil seal, and the muddy water preventing seal integrally has the attaching portion which is attached onto the peripheral surface of the shaft, and the seal lip which is provided so as to be directed to the outer side in the diametrical direction from the attaching portion and slidably comes into close contact with the end surface in the motor exterior side of the end plate, that is, the muddy water preventing seal is constructed as the contact type seal. The contact type seal is structured such that any gap is not formed in the case that the seal lip is in contact with the other member (the end plate), and is accordingly excellent in the sealing performance in comparison with the non-contact type seal which forms a gap.

Figure 4A:
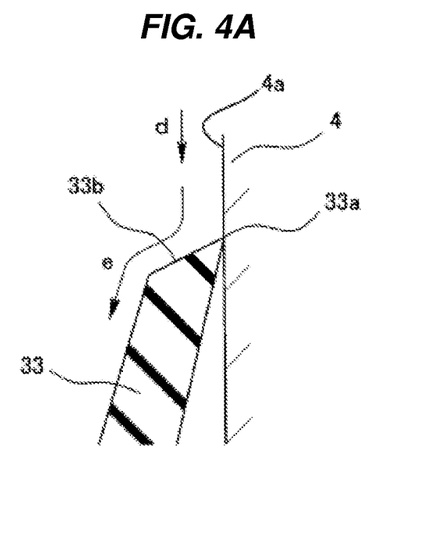
FIG. 4A is an explanatory view of a scraper structure according to the present invention.
Figure 4B:
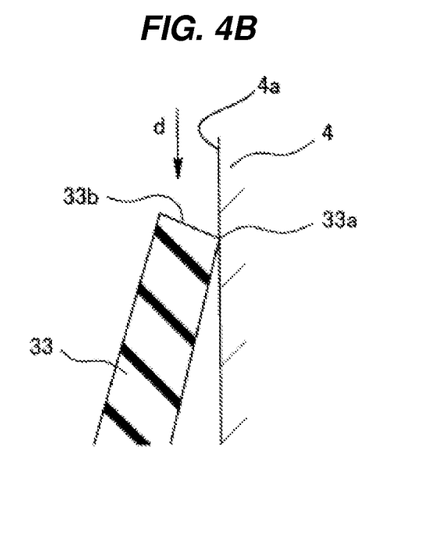
FIG. 4B is an explanatory view of a comparative example.

Further, in the muddy water preventing seal, the seal lip has the lip end back surface portion which is formed into the inclined surface shape so that the outer diameter becomes smaller according to the moving far away from the end surface in the motor exterior side of the end plate. In other words, the seal lip has the lip end back surface portion which is formed into a scraper shape. Since the muddy water (an arrow d) entering from the above side of the seal lip 33 flows in a direction in which the muddy water moves away from the end plate 4 according to the incline of the inclined surface on the lip end back surface portion 33b (an arrow e) as shown in FIG. 4A in the scraper shaped lip end back surface portion, the muddy water is hard to enter into an inside space of the seal lip 33 from the sliding portion where the lip end 33a comes into contact with the end plate 4. Therefore, the sealing performance is improved. On the contrary, in FIG. 4B which is shown as a comparative example, the direction of incline of the lip end back surface portion 33b is inverted, that is, the seal lip is formed into the inclined surface shape so that the outer diameter becomes larger according to the movement of the lip end back surface portion 33b away from the end plate 4. Therefore, the muddy water (an arrow d) entering from the above side of the seal lip 33 stays on the lip end back surface 33b, or flows in a circumferential direction from the lip end back surface. In any case, it is highly likely that the muddy water enters into the inside space of the seal lip 33 from the sliding portion where the lip end 33a comes into contact with the end plate 4.

Further, since the engine rear seal according to the present invention is provided with the contact type seal as the muddy water preventing seal as mentioned above, there is fear that a specific fuel consumption is lowered due to an increase of the sliding torque even if the sealing performance is improved. However, in the present invention, the seal lip is structured such that the lip end comes into contact with the end surface in the motor exterior side of the end plate when the shaft rotates at the low speed, and the lip end moves away from the end surface in the motor exterior side of the end plate on the basis of the action of the centrifugal force when the shaft rotates at the high speed. Therefore, since the lip end moves away from the end surface in the motor exterior side of the end plate on the basis of the action of the centrifugal force at the high speed rotating time of the shaft having the great sliding torque, it is possible to inhibit the sliding torque from being extremely increased. Under the muddy water environment, the vehicle such as the motor vehicle is expected to travel at the low speed. At this time, since the shaft rotates at the low speed and the lip end is in contact with the end surface in the motor exterior side of the end plate, it is thought that the shortfall of the muddy water sealing performance is not generated.

Further, since the engine rear seal according to the present invention is used under a condition that the end plate is arranged in the motor exterior side of the housing and the flywheel connected to the shaft is arranged further in the motor exterior side of the end plate, as mentioned above, it is thought that the muddy water sealing performance is further improved by setting the non-contact type seal formed by a small gap in an axial direction between the end plate and the flywheel. The magnitude of the gap is preferably equal to or less than 3 mm. In this case, since the gap is narrow, the muddy water preventing seal can be attached onto the peripheral surface of the shaft in the inner peripheral side of the end plate.

Effect of the Invention

The present invention achieves the following effects.

In other words, in the engine rear seal according to the present invention, as mentioned above, the muddy water preventing seal is combined with the oil seal, and the muddy water preventing seal is constructed as the contact type seal integrally having the attaching portion which is attached onto the peripheral surface of the shaft, and the seal lip which is provided from the attaching portion toward the outer side in the diametrical direction and slidably comes into close contact with the end surface in the motor exterior side of the end plate, under the condition that the end plate is arranged in the motor exterior side of the housing, and the flywheel connected to the shaft is arranged further in the motor exterior side of the end plate. Therefore, it is possible to improve the muddy water sealing performance.

Further, in the muddy water preventing seal, since the lip end back surface portion is formed into the scraper shape, and flows the entering muddy water in the direction in which the muddy water moves away from the lip sliding portion, it is possible to further improve the muddy water sealing performance.

Further, since the lip end moves away from the end surface in the motor exterior side of the end plate on the basis of the action of the centrifugal force at the high speed rotating time of the shaft having the great sliding torque, it is possible to inhibit the sliding torque from being extremely increased.

Further, in the case that the muddy water preventing seal is attached onto the peripheral surface of the shaft in the inner peripheral side of the end plate in which the gap in the axial direction between the muddy water preventing seal and the flywheel is set to be equal to or less than 3 mm, the non-contact type third seal is set between the end plate and the flywheel, in addition to the oil seal and the muddy water preventing seal. Therefore, it is possible to further improve the muddy water sealing performance.

DETAILED DESCRIPTION OF PREFERRED EMBODIMENTS

The following embodiments are included in the present invention.

(1) With reference to the sealing performance against the muddy water, the conventional specification has devise a countermeasure by reinforcing the dust lip of the oil seal, however, under such a severe environment that the engine goes under the water, wear makes progress and fastening margin is done away only by the dust lip, so that a clearance is finally formed. In the case that the clearance is formed, the muddy water intrusion immediately occurs. Therefore, a defect of the engine itself occurs due to the muddy water intrusion.

(2) In order to dissolve the problem mentioned above, the seal for the muddy water is added by utilizing a space in the atmospheric air side of the seal, in the present invention. In the muddy water seal, the fastening margin is set to be small and is set to such a degree that the muddy water seal is in light contact with the end surface of the end plate. The shape of the lip leading end is formed into the scraper shape, and into such a shape that the lip leading end is hard to come to the oil seal portion in relation to the muddy water flow.

In the case that the shaft rotation is the low rotation, the fastening margin exists, and in the case that the shaft rotation comes to the high rotation, a clearance is generated so as to make an influence applied to the torque extremely mall. The traveling case under the muddy water environment is thought to be a low rotation area. A labyrinth structure is formed between the end plate and the flywheel (the ring gear) so as to form such a structure that the muddy water is hard to come.

(3) As an effect achieved by the present invention, in the case that the muddy water comes to the seal portion from the above side, the water flows downward by the inclined surface of the lip back surface, and does not come to the oil seal side. Further, even in the case that the muddy water comes from the below side, the fastening margin exists as long as the low rotation. Therefore, it is possible to seal with the target seal. Since the lip loses the fastening margin due to the centrifugal force according to the rise of the rotating speed, an adverse effect applied to the torque can be suppressed to the minimum. Further, since the muddy water is hard to come to the seal portion in the high rotation due to the labyrinth by the end plate and the flywheel, there is no problem even if the fastening margin of the target seal does not exist. The progress of wear is slow by minimizing the fastening margin, and a long time sealing can be expected.

Embodiments

Next, a description will be given of embodiments according to the present invention with reference to the accompanying drawings.

Figure 1:
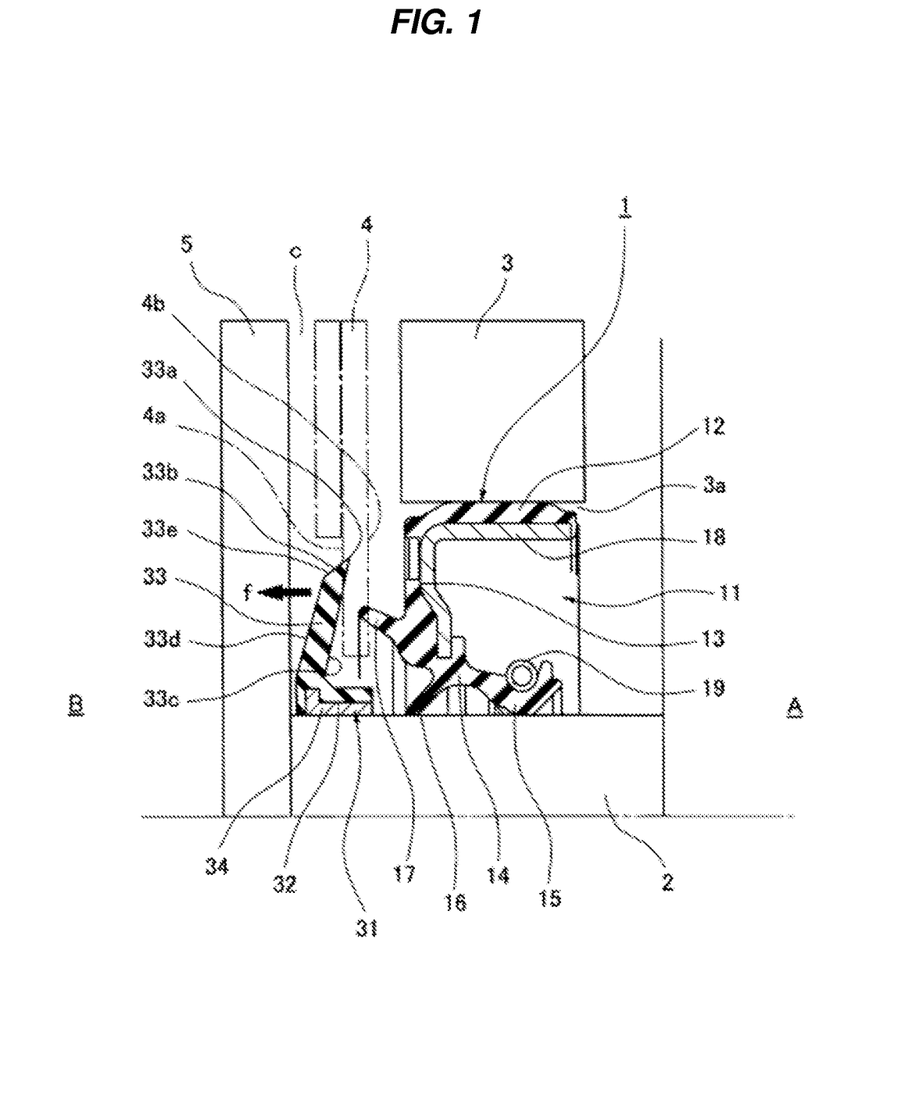
FIG. 1 is a half cut cross sectional view of an engine rear seal according to an embodiment of the present invention.
Figure 2:
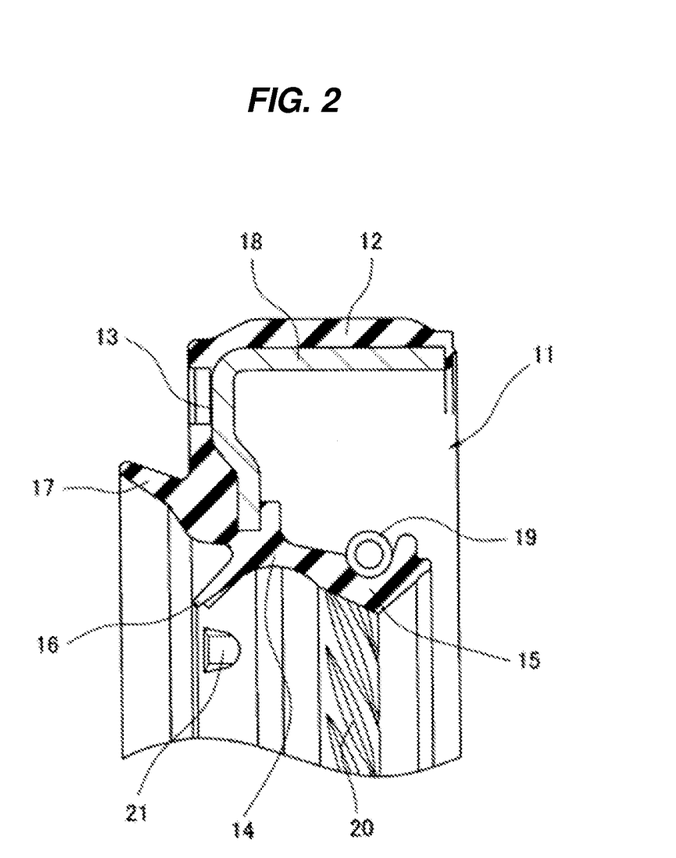
FIG. 2 is a cross sectional view of a substantial part and shows a single part state of an oil seal which is used in the seal.

FIG. 1 shows a half cut cross section of an engine rear seal (a sealing device) 1 according to an embodiment of the present invention. FIG. 2 shows a single part state of an oil seal 11 which is used in the engine rear seal 1. As shown in FIG. 1, the engine rear seal 1 according to the embodiment is used for sealing an engine oil in a motor interior side (a sealing fluid side) A in a rear end portion of a crank shaft 2 in an engine for a vehicle such as a motor vehicle, and for inhibiting muddy water from entering in a motor exterior side (an atmospheric air side) B. In a condition (a structure) of an engine rear portion (a crank shaft rear end portion) to which the engine rear seal 1 is installed, an end plate 4 is arranged in the motor exterior side B of a housing (an engine housing) 3, and a flywheel 5 connected to the shaft 2 is arranged further in the motor exterior side B of the end plate 4. In order to show a free state of lips 17 and 33, the end plate 4 is drawn by a virtual line.

The engine rear seal 1 has an oil seal 11 which is installed to an inner periphery of a shaft hole 3a of the housing 3 and slidably comes into close contact with a peripheral surface of the shaft 2, and a muddy water preventing seal 31 which is arranged in the motor exterior side B of the oil seal 11. The muddy water preventing seal 31 integrally has an attaching portion 32 which is attached onto a peripheral surface of the shaft 2, and a seal lip 33 which is provided from the attaching portion 32 toward an outer side in a diametrical direction and slidably comes into close contact with an end surface 4a in the motor exterior side of the end plate 4. The seal lip 33 has a lip end 33a, and also has a lip end back surface portion 33b which is formed into an inclined surface shape so that an outer diameter becomes smaller little by little according to moving far away from the end surface 4a in the motor exterior side of the end plate 4. Further, the seal lip 33 is structured such that the lip end 33a comes into contact with the end surface 4a in the motor exterior side of the end plate 4 when the shaft 2 rotates at a low speed, and the lip end 33a moves away from the end surface 4a in the motor exterior side of the end plate 4 on the basis of an action of a centrifugal force when the shaft 2 rotates at a high speed, so that the lip end 33a is movable close to and away from the end surface 4a.

Details of each of the portions or each of the parts are as follows.

The oil seal 11 is formed into an annular shape by a predetermined rubber-like elastic body (FKM which is excellent in a heat resistance), and integrally has an attaching portion 12 which is attached to an inner peripheral surface of a shaft hole 3a of the housing 3, a flange portion 13 which is provided from an end portion in a motor exterior side of the attaching portion 12 toward an inner side in a diametrical direction, and a seal portion 14 which is provided in an inner peripheral end portion of the flange portion 13, as its constituting elements, and the seal portion 14 is integrally provided with a seal lip (a first radial lip) 15 which is directed to the motor interior side A and slidably comes into close contact with a peripheral surface of the shaft 2, a first dust lip (a second radial lip) 16 which is directed to the motor exterior side B and slidably comes into close contact with the peripheral surface of the shaft 2, and a second dust lip (a side lip) 17 which is directed to the motor exterior side B in the same manner and slidably comes into close contact with the end surface 4b in the motor interior side of the end plate 4. A metal ring 18 approximately formed into an L-shaped cross sectional form is embedded in the attaching portion 12 and the flange portion 13. A garter spring 19 is fitted to the seal lip 15. Further, as shown in FIG. 2, a projection 20 for constructing a screw seal is provided in an inner peripheral surface of the seal lip 15, that is, an inclined surface in the motor exterior side, and a projection 21 for controlling a contact attitude of the lip 16 is provided in an inner peripheral surface of the first dust lip (the second radial lip) 16.

Turning back to the description of FIG. 1, the muddy water preventing seal 31 is formed into an annular shape by a predetermined rubber-like elastic body (FKM which is excellent in the heat resistance or HNBR which is excellent in a muddy water resistance), and integrally has an attaching portion 32 which is attached onto the peripheral surface of the shaft 2, and a seal lip 33 which is provided form an end portion in the motor exterior side of the attaching portion 32 toward an outer side in a diametrical direction and slidably comes into close contact with the end surface 4a in the motor exterior side of the end plate 4, as its constituting elements. A metal ring 34 is embedded in the attaching portion 32.

The seal lip 33 is formed diagonally outward so that its leading end portion is positioned closer to the motor interior side A than its base end portion, and slidably comes into close contact with the end surface 4a in the motor exterior side of the end plate 4 by the lip end 33a corresponding to its leading end portion.

Further, the seal lip 33 has three surfaces which are constructed by a motor interior side end surface 33c, a motor exterior side end surface 33d and a leading end surface 33e. Among them, the motor interior side end surface 33c is provided diagonally outward so that its leading end portion is positioned closer to the motor interior side A than its base end portion so as to form an inclined surface. The motor exterior side end surface 33d is also provided diagonally outward so that its leading end portion is positioned closer to the motor interior side A than its base end portion so as to form an inclined surface. The leading end surface 33e forms an inclined surface so that an outer diameter becomes smaller little by little from the leading end portion of the motor interior side end surface 33a toward the leading end portion of the motor exterior side end surface 33d. The lip end 33a is formed at a position where the motor interior side end surface 33c and the leading end surface 33e intersect. The lip end back surface portion 33b is formed by the leading end surface 33e.

Further, the seal lip 33 is structured, as mentioned above, such that the lip end 33a comes into contact with the end surface 4a in the motor exterior side of the end plate 4 when the shaft 2 rotates at a low speed, and the lip end 33a swings in a direction of an arrow f and moves away from the end surface 4a in the motor exterior side of the end plate 4 on the basis of the action of the centrifugal force when the shaft 2 rotates at a high speed.

Further, the muddy water preventing seal 31 including the seal lip 33 is structured such as to be attached onto the peripheral surface of the shaft 2 in the inner peripheral side of the end plate 4 in which an axial gap c between the muddy water preventing seal 31 and the flywheel 5 is set to be equal to or less than 3 mm ($0 < c \leq 3$ mm).

In the engine rear seal 1 having the structure mentioned above, under a condition that the end plate 4 is arranged in the motor exterior side B of the housing 3, and the flywheel 5 connected to the shaft 2 is arranged in further the motor exterior side B of the end plate 4, the muddy water preventing seal 31 is combined with the motor exterior side B of the oil seal 11, and the muddy water preventing seal 31 integrally has the attaching portion 32 which is attached onto the peripheral surface of the shaft 2, and the seal lip 33 which is provided so as to be directed to the outer side in the diametrical direction from the attaching portion 32 and slidably comes into close contact with the end surface 4a in the motor exterior side of the end plate 4, that is, the muddy water preventing seal is constructed as the contact type seal. The contact type seal is structured such that any gap is not formed in the case that the seal lip 33 is in contact with the other member (the end plate 4), and is accordingly excellent in the sealing performance in comparison with the non-contact type seal which forms a gap. Therefore, according to the embodiment of the present invention, it is possible to improve the muddy water sealing performance.

Further, in the muddy water preventing seal 31, the seal lip 33 has the lip end back surface portion 33b which is formed into the inclined surface shape so that the outer diameter becomes smaller according to the moving far away from the end surface 4a in the motor exterior side of the end plate 4. In other words, the seal lip 33 has the lip end back surface portion 33b which is formed into a scraper shape. Since the muddy water (the arrow d) entering from the above side of the seal lip 33 flows in a direction in which the muddy water moves away from the end plate 4 according to the incline of the inclined surface on the lip end back surface portion 33b (an arrow e) as shown in FIG. 4A in the scraper shaped lip end back surface portion 33b, the muddy water is hard to enter into an inside space of the seal lip 33 from the sliding portion where the lip end 33a comes into contact with the end plate 4. Therefore, the sealing performance is improved. On the contrary, in FIG. 4B which is shown as a comparative example, the direction of incline of the lip end back surface portion 33b is inverted, that is, the seal lip is formed into the inclined surface shape so that the outer diameter becomes larger little by little according to the movement of the lip end back surface portion 33b away from end surface 4a in the motor external side of the end plate 4. Therefore, the muddy water (an arrow d) entering from the above side of the seal lip 33 stays on the lip end back surface 33b, or flows in a circumferential direction from the lip end back surface. In any case, it is highly likely that the muddy water enters into the inside space of the seal lip 33 from the sliding portion where the lip end 33a comes into contact with the end plate 4. Therefore, according to the embodiment of the present invention, it is possible to improve the muddy water sealing performance.

Further, in the muddy water preventing seal 31, the seal lip 33 is structured such that the lip end 33a comes into contact with the end surface 4a in the motor exterior side of the end plate 4 when the shaft 2 rotates at the low speed, and the lip end 33a moves away from the end surface 4a in the motor exterior side of the end plate 4 on the basis of the action of the centrifugal force when the shaft 2 rotates at the high speed. Therefore, since the lip end 33a moves away from the end surface 4a in the motor exterior side of the end plate 4 on the basis of the action of the centrifugal force at the high-speed rotating time of the shaft 2 having the great sliding torque, it is possible to inhibit the sliding torque from being extremely increased.

Further, the muddy water preventing seal 31 is structured such as to be attached onto the peripheral surface of the shaft 2 in the inner peripheral side of the end plate 4 in which the axial gap c between the muddy water preventing seal 31 and the flywheel 5 is set to be equal to or less than 3 mm. Therefore, since the non-contact type third seal is set between the end plate 4 and the flywheel 5, in addition to the oil seal 11 and the muddy water preventing seal 31, it is possible to further improve the muddy water sealing performance.

Figure 3:
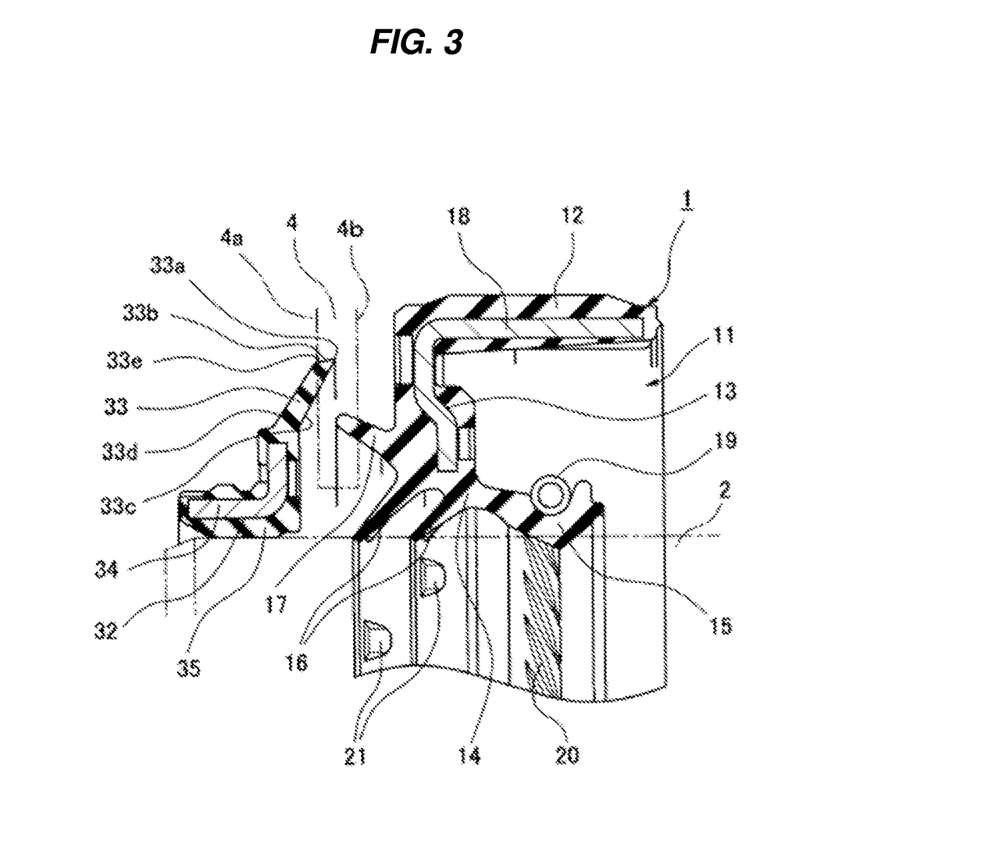
FIG. 3 is a cross sectional view of a substantial part of an engine rear seal according to the other embodiment of the present invention.

In the embodiment, the muddy water preventing seal 31 is structured such that the seal lip 33 is integrally formed in the end portion in the motor exterior side of the attaching portion 32, however, the seal lip 33 may be integrally formed in the end portion in the motor interior side of the attaching portion as shown in FIG. 3 for certain reasons of an installing space. Further, in the embodiment mentioned above, the muddy water preventing seal 31 is metal fitted to the shaft 2 by the metal ring 34, however, may be rubber fitted to the shaft 2 by attaching a rubber portion 35 which is integrally formed with the seal lip 33 to an inner peripheral surface of the metal ring 34 as shown in FIG. 3. Further, in the oil seal 11 in FIG. 3, a plurality of (two) first dust lips (second radial lips) 16 are provided.

What is claimed is:

1. An engine rear seal installed to an engine rear portion in which an end plate is arranged on a motor exterior side of a housing, and a flywheel connected to a shaft is arranged further on a motor exterior side of said end plate, the engine rear seal comprising:
    an oil seal installed to an inner periphery of a shaft hole of said housing, said oil seal slidably coming into close contact with a peripheral surface of said shaft; and
    a water preventing seal arranged on a motor exterior side of said oil seal,
    wherein said water preventing seal integrally includes:
        an attaching portion attached onto the peripheral surface of said shaft, and
        a seal lip directed to an outer side in a diametrical direction from said attaching portion, said seal lip slidably coming into close contact with a first end surface of said end plate, said first end surface being on the motor exterior side of said end plate,
    wherein said seal lip has a lip end back surface portion having an inclined surface shape with an outer diameter that progressively decreases away from the end surface,
    wherein said seal lip is constructed by:
        a motor interior side end surface that is provided diagonally outward so that a leading end portion of the motor interior side end surface is positioned closer to the motor interior side of said oil seal than a base end portion of the motor interior side end surface so as to form a first inclined surface;
        a motor exterior side end surface that is provided diagonally outward so that a leading end portion of the motor exterior side end surface is positioned closer to the motor interior side of said oil seal than a base end portion of the motor exterior side end surface so as to form a second inclined surface;
        a leading end surface that extends from the leading end portion of the motor interior side end surface to the leading end portion of the motor exterior side end surface, the leading end surface being a planar circumferential inclined surface having an outer diameter that progressively decreases from the leading end portion of the motor interior side end surface toward the leading end portion of the motor exterior side end surface; and a lip end that is formed at a position where the motor interior side end surface and the leading end surface intersect;

wherein said seal lip is structured such that said lip end is in contact with the end surface when said shaft rotates at a low speed, and said lip end moves away from the end surface due to centrifugal force when said shaft rotates at a high speed, wherein a metal ring is embedded in the attaching portion, the metal ring including:

a cylindrical base; and a flange upstanding from said cylindrical base so that an entirety of said metal ring has an L-shaped cross-section, wherein said flange has:

a proximal end integrally joined to said cylindrical base; and a distal end opposite said proximal end, and wherein said seal lip extends from said distal end of said flange toward said outer side in said diametrical direction wherein said cylindrical base of said metal ring axially extends from said flange of said metal ring toward said sealing fluid side so as to be radially juxtaposed with a circumferential inner surface of said end plate, and wherein said oil seal is integrally provided with a side lip directed to the motor exterior side and slidably contacting a second end surface of the end plate, the second end surface being on the motor interior side of the end plate.

2. The engine rear seal according to claim 1, wherein said water preventing seal is attached onto the peripheral surface of said shaft on an inner peripheral side of said end plate in which a gap in an axial direction between the water preventing seal and said flywheel is set to be equal to or less than 3 mm.

3. The engine rear seal according to claim 1, wherein said oil seal is further integrally provided with:

a first radial lip directed to the motor interior side and slidably contacting the peripheral surface of the shaft; and a second radial lip directed to the motor exterior side and slidably contacting the peripheral surface of the shaft.

4. The engine rear seal according to claim 3, wherein a garter spring is fitted to the first radial lip.

5. The engine rear seal according to claim 3, wherein a screw seal projection is provided on an inner peripheral inclined surface of the first radial lip on the motor exterior side; and a projection configured to control a contact attitude of the second radial lip is provided on an inner peripheral surface of the second radial lip.

6. The engine rear seal according to claim 1, wherein the oil seal is in an annular shape, and integrally has:

an attaching portion which is attached to an inner peripheral surface of the shaft hole of the housing; and a flange portion which diametrically extends toward an inner side from an end of the attaching portion on the motor exterior side.

7. The engine rear seal according to claim 6, wherein a metal ring having an approximately L-shaped cross section is embedded in the attaching portion and the flange portion.

* * * * *